US012802314B2

(12) United States Patent
Panin et al.

(10) Patent No.: US 12,802,314 B2
(45) Date of Patent: Nov. 17, 2026

(54) AI-DRIVEN MOTION CORRECTION OF PET DATA

(71) Applicant: Siemens Medical Solutions USA, Inc., Malvern, PA (US)

(72) Inventors: Vladimir Panin, Knoxville, TN (US); Maurizio Conti, Knoxville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 331 days.

(21) Appl. No.: 18/437,354

(22) Filed: Feb. 9, 2024

(65) Prior Publication Data

US 2025/0259349 A1 Aug. 14, 2025

(51) Int. Cl.
*G06T 12/10* (2026.01)
*G06T 7/00* (2017.01)

(52) U.S. Cl.
CPC ............ *G06T 12/10* (2026.01); *G06T 7/0012* (2013.01); *G06T 2207/10104* (2013.01); *G06T 2207/20081* (2013.01); *G06T 2207/20084* (2013.01); *G06T 2207/30004* (2013.01); *G06T 2211/441* (2023.08)

(58) Field of Classification Search
CPC ......... G06T 2207/30004; G06T 7/0012; G06T 11/003–008; G06T 2207/10081; G06T 2207/10104; G06T 2207/20081; G06T 2207/20084; G06T 2211/441; A61B 6/5247; A61B 6/032; A61B 6/5211; A61B 6/5235; A61B 6/037; A61B 6/5264; A61B 6/5258; A61B 6/5205
See application file for complete search history.

(56) References Cited

U.S. PATENT DOCUMENTS

| | | | | |
|---|---|---|---|---|
| 2005/0253853 | A1* | 11/2005 | Sayre | G06T 5/70 345/474 |
| 2010/0026880 | A1* | 2/2010 | Ito | G06T 5/20 348/208.99 |
| 2019/0340793 | A1* | 11/2019 | Jin | G06T 11/005 |
| 2021/0181287 | A1* | 6/2021 | Sommer | G06T 5/60 |
| 2021/0304457 | A1* | 9/2021 | Qi | G06T 7/246 |
| 2022/0215599 | A1* | 7/2022 | Bharkhada | G01T 1/1663 |
| 2023/0009528 | A1* | 1/2023 | Schaefferkoetter | A61B 6/037 |
| 2024/0008832 | A1* | 1/2024 | Chan | G06N 3/0464 |

* cited by examiner

*Primary Examiner* — Sean M Conner
*Assistant Examiner* — Stefano Anthony Dardano

(57) ABSTRACT

Systems and methods include acquisition of an anatomical image of an object, acquisition of molecular imaging data of the object at the plurality of photon detectors, reconstruction of a functional image based on the molecular imaging data, input of the anatomical image and the functional image to a trained neural network to generate a second functional image, and presentation of the second functional image.

9 Claims, 6 Drawing Sheets

AI-DRIVEN MOTION CORRECTION OF PET DATA

BACKGROUND

Molecular Imaging (MI) generates functional images which represent biological processes (e.g., glucose metabolism, receptor affinity) occurring within a patient. According to MI techniques, a radiotracer is administered to a patient and radiation (e.g., gamma rays) is emitted from within the patient and captured by detectors. The detectors may capture a plurality of sets of emission data, each of which may be considered a "frame" and is associated with a respective time period. The time period of two frames may overlap in some scenarios.

A patient may exhibit respiratory and/or other motion while the sets of emission data are being captured. This motion adversely affects the diagnostic quality of images generated from the emission data. For instance, motion patterns caused by breathing can lead to significant organ displacement and subsequent blurring of clinically-relevant features in a resulting image.

To address this problem, motion patterns are monitored using external devices or by identifying movement in the raw data domain. The patterns are characterized into phases, and the emission data is segmented into one motion-frozen frame for each phase. In some approaches, an image is reconstructed from the emission data of each motion-frozen frame, the reconstructed images are registered to a target image, and the registered images are averaged to generate a final image. According to another approach, a single image is reconstructed from all available emission data while incorporating the characterized motion patterns into the reconstruction process. Each of these approaches is computationally-intensive and requires accurate characterization of motion phases corresponding to correction factors such as attenuation.

Systems are desired to generate diagnostically-suitable motion-corrected images from MI data in a computationally-efficient manner.

DETAILED DESCRIPTION

The following description is provided to enable any person in the art to make and use the described embodiments. Various modifications, however, will remain apparent to those in the art.

Embodiments utilize a network to "deblur" MI images using a corresponding anatomical image. Such a network may be trained based on a plurality of sets of images consisting of an anatomical image, a corresponding MI image including motion artifacts, and a corresponding MI image including no or fewer motion artifacts (e.g., a motion-corrected MI image). Embodiments may require fewer resources than the above-described motion correction methods, due at least in part to eliminating the need to identify motion and compute motion vectors therefrom.

Figure 1:
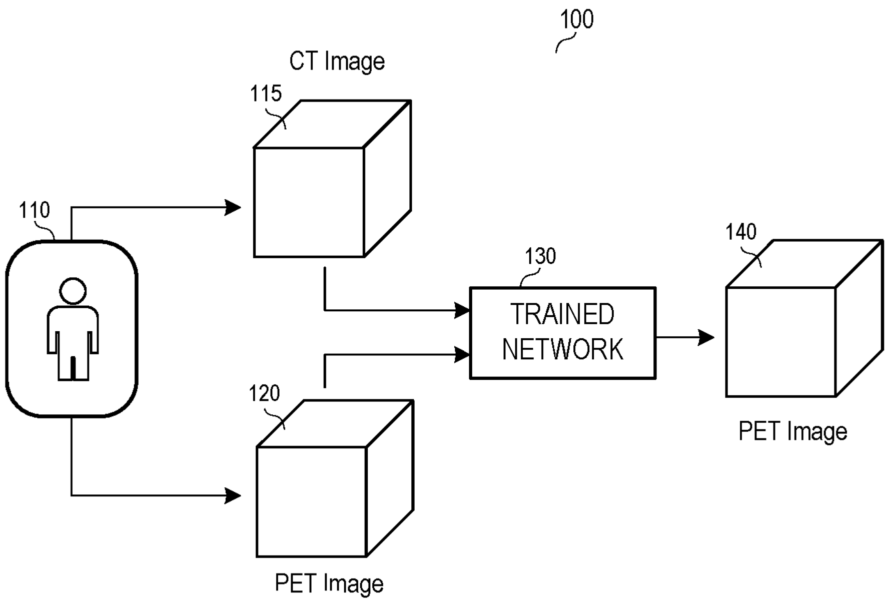
FIG. 1 is a block diagram of a system to generate a motion-corrected MI image according to some embodiments.

FIG. 1 is a block diagram of system 100 to generate a motion-corrected MI image according to some embodiments. The illustrated components of system 100 may be implemented in computer hardware, in program code and/or in one or more computing systems executing such program code as is known in the art. Such a computing system may include one or more processing units which execute program code stored in a memory system. More than one functional component may be implemented by a single computing system in some embodiments. One or more of the computing systems may comprise a virtual machine, and one- or more computing systems may comprise a cloud-based compute resource providing on-demand scalability and failure recovery.

Scanner 110 may be capable of acquiring Computed Tomography (CT) data and reconstructing CT images therefrom, and also of acquiring Positron Emission Tomography (PET) data and reconstructing PET images therefrom. Embodiments are not limited to these two imaging modalities. For example, embodiments may be implemented using other MI modalities including Single Photon Computed Tomography (SPECT) imaging and other anatomical imaging modalities such as Magnetic Resonance (MR) imaging.

Scanner 110 generates three-dimensional CT image 115 of a patient using any suitable CT imaging protocol. Scanner 110 may generate PET data substantially contemporaneously with the acquisition of CT image 115. For example, a CT imaging system of scanner 110 may be operated to acquire CT image 115 while a patient lies in a given position on a bed of scanner 110, and a PET imaging system of scanner 110 may be operated shortly thereafter to acquire PET data while the patient remains on the bed in the given position. Since the geometric transformation (if any) between coordinates of the CT imaging system and the PET imaging system is known, resulting images may be easily registered with one another.

Scanner 110 generates PET data using any suitable PET imaging protocol. For example, a radiopharmaceutical tracer is introduced into a patient body via arterial injection. Radioactive decay of the tracer generates positrons which eventually encounter electrons and are annihilated thereby. The annihilation produces two 511 keV photons which travel in approximately opposite directions. A ring of detectors surrounding the body detects 511 keV photons and identifies "coincidences" based thereon.

A coincidence is identified when two detector crystals disposed on opposite sides of the body detect the arrival of two photons within a short time window indicating that the two photons arose from the same positron annihilation. Because the two "coincident" photons travel in approximately opposite directions, the locations of the two detector crystals determine a Line-of-Response (LOR) along which an annihilation may have occurred. Time-of-flight (TOF) PET additionally measures the difference between the detection times of the two photons arising from the annihilation. This difference may be used to estimate a particular position along the LOR at which the annihilation occurred.

The acquired PET data may consist of raw (i.e., list-mode) data and/or sinograms. List-mode data may represent each detected annihilation as an LOR between two detector crystals, the time at which each photon of the annihilation reached each detector crystal and (in a TOF system) the difference between the arrival times of the two photons. A sinogram is a data array of the angle versus the displacement of each LOR. A sinogram includes one row containing the LOR for a particular azimuthal angle. Each of these rows corresponds to a one-dimensional parallel projection of the tracer distribution at a different coordinate. A sinogram stores the location of the LOR of each coincidence such that all the LORs passing through a single point in the volume trace a sinusoid curve in the sinogram.

PET image 120 is reconstructed from the acquired PET data using any suitable reconstruction operation that is or becomes known. Reconstruction may include subtraction of random coincidences and scatter coincidences from the PET data, application of attenuation correction based on a linear attenuation coefficient map ("mu-map") derived from CT image 115, and any other suitable reconstruction steps. The reconstruction steps may be similar to reconstruction steps which were used to generate training PET images for use in training network 130.

According to some embodiments, motion-correction is not performed on the PET data, either on the raw data or during image reconstruction. Accordingly, PET image 120 may be blurred (i.e., may exhibit motion artifacts) due to motion of the patient during acquisition of the PET data.

Network 130 may comprise hardware and software specifically-intended for executing algorithms based on a specified network architecture and trained parameters. Network 130 has been trained as will be described below to generate a PET image based on an input CT image and an input PET image. Accordingly, CT image 115 and PET image 120 are input to trained neural network 130, which generates PET image 140 based thereon. PET image 140 output by network 130 is intended to represent a motion-corrected version of PET image 120. In other words, trained network 130 (with the assistance of CT image 115) acts as a substitute for prior motion-correction procedures.

Figure 2:
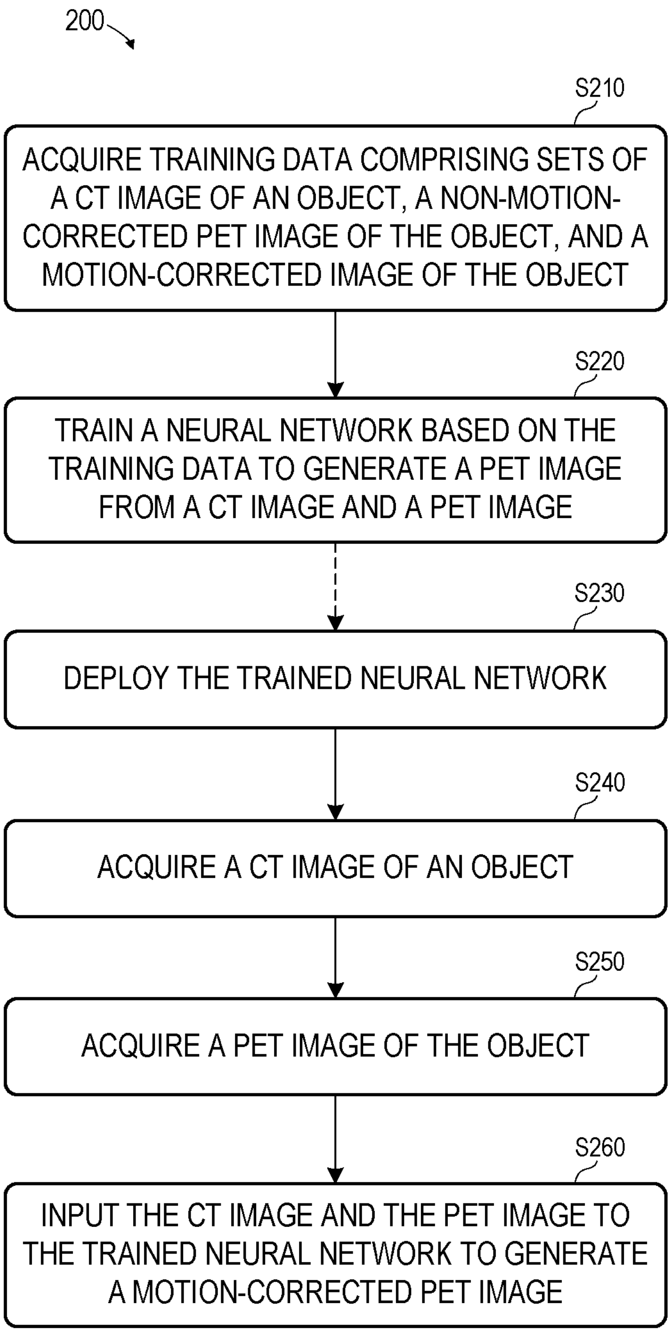
FIG. 2 is a flow diagram of a process to train a network to generate a motion-corrected MI image and use the network to motion-correct an MI image according to some embodiments.

FIG. 2 is a flow diagram of process 200 to train a network to generate a motion-corrected MI image and use the trained network to motion-correct an MI image according to some embodiments. Process 200 may be performed by any combination of hardware and software that is or becomes known. Program code embodying processes described herein may be stored by any non-transitory tangible medium, including a fixed disk, a volatile or non-volatile random-access memory, a DVD, a Flash drive, and a magnetic tape, and executed by any suitable processing unit, including but not limited to one or more microprocessors, microcontrollers, processor cores, and processor threads. Embodiments are not limited to the examples described below.

A plurality of sets of training data are acquired at S210. Each set of training data comprises a CT image of an object, a non-motion-corrected PET image of the object, and a corresponding motion-corrected image of the object. The non-motion-corrected PET image includes more motion artifacts than the motion-corrected image of the object.

Figure 3:
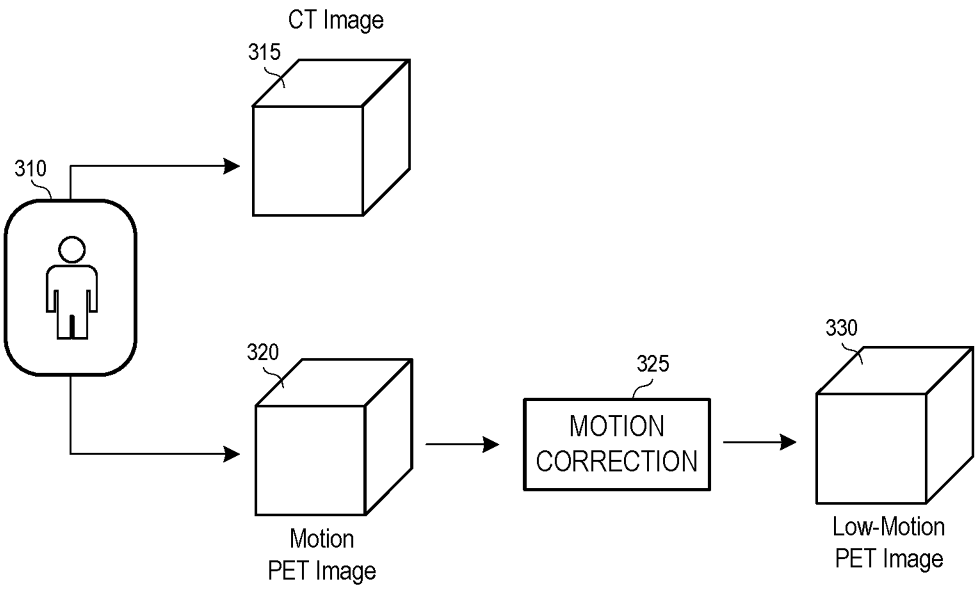
FIG. 3 illustrates generation of neural network training data according to some embodiments.

FIG. 3 illustrates generation of a set of neural network training data according to some embodiments. Scanner 310 may comprise a PET/CT scanner which generates CT image 315 and corresponding motion PET image 320, contemporaneously and of the same patient. Motion PET image 320 may exhibit motion artifacts due to movement of the patient during acquisition of the PET data from which motion PET image 320 was reconstructed.

Motion correction component 325 applies one or more motion correction algorithms to motion PET image 320 to generate low-motion PET image 330. The one or more motion correction algorithms may comprise any motion correction algorithm that is or becomes known. Images 320 and 330 are denoted as motion and low-motion images, respectively, to indicate that low-motion image 330 exhibits fewer motion artifacts than motion PET image 320. Image 330 may exhibit no motion artifacts in some embodiments.

CT image 315, motion PET image 320 and low-motion PET image 330 comprise a set of training data. Many other sets of training data may be generated as shown in FIG. 3, using different combinations of patients, patient motion, PET/CT scanners, and/or motion correction algorithms.

Figure 4:
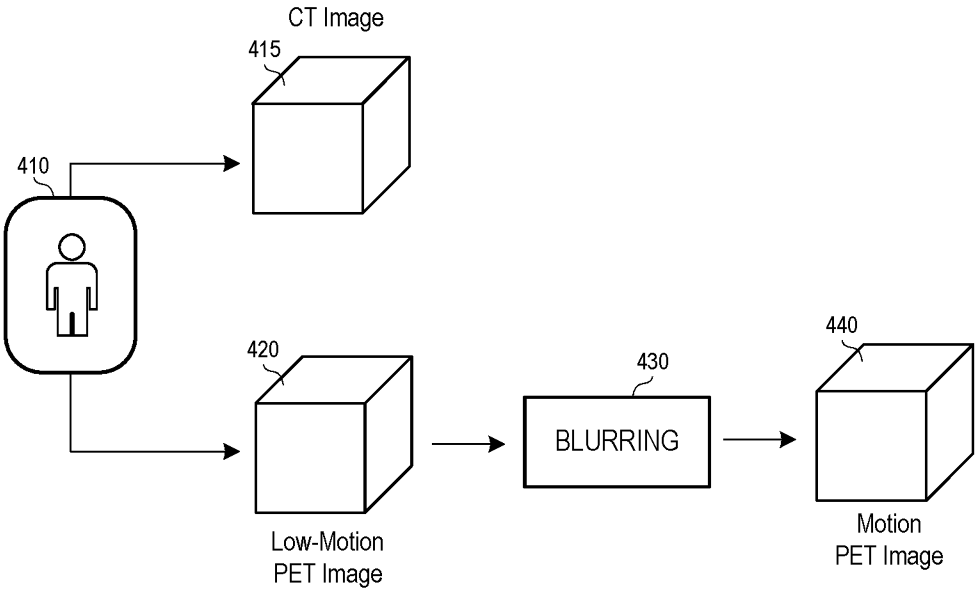
FIG. 4 illustrates generation of neural network training data according to some embodiments.

FIG. 4 illustrates generation of a set of neural network training data according to some embodiments. Scanner 410 contemporaneously generates CT image 415 and corresponding low-motion PET image 420. PET image 420 is denoted as low-motion to indicate that that the imaged region of the patient was stationary (or substantially stationary) during acquisition of the PET data from which low-motion PET image 420 was reconstructed. Determination of whether the patient was stationary (or substantially stationary) during the acquisition may be based on external monitoring systems, an analysis of the raw PET data, and/or an examination of PET image 420 for motion artifacts.

Blurring component 430 applies one or more motion-simulating algorithms to low-motion PET image 420 to generate motion PET image 330. The one or more motion-simulating algorithms applied by blurring component 430 may comprise any motion-simulating algorithm that is or becomes known. The motion-simulating algorithms may be applied to list-mode data or sinogram data from which image 420 was reconstructed, to PET image 420 itself, or in any other manner.

CT image 415, motion PET image 440 and low-motion PET image 420 comprise a set of training data. Again, many other sets of training data may be generated as shown in FIG. 4, using different combinations of patients, PET/CT scanners, and/or blurring algorithms.

Figure 5:
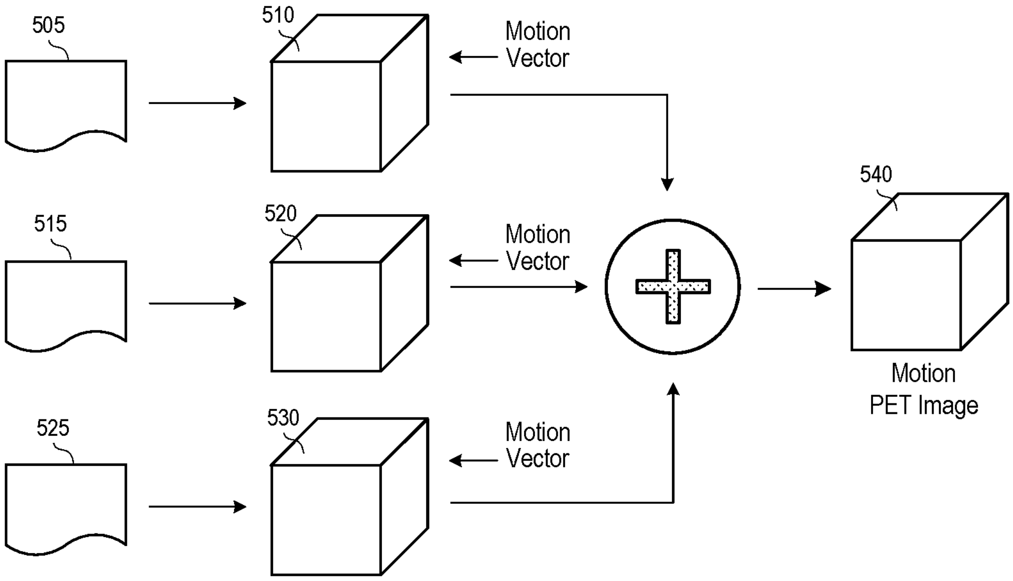
FIG. 5 illustrates generation of neural network training data according to some embodiments.

FIG. 5 illustrates generation of a motion PET image of FIG. 4 according to some embodiments. It will be assumed that scanner 410 acquires list-mode data of low-motion PET image 420 over a period of time. As is known in the art, blurring component 430 may divide the list-mode data into frames 505, 515 and 525. Each of frames 505, 515 and 525 includes list-mode data acquired over a respective time period. For example, frame 505 includes list-mode data acquired from $t_0$-$t_1$, frame 515 includes list-mode data acquired from $t_1$-$t_2$, and frame 525 includes list-mode data acquired from $t_2$-$t_3$.

A respective PET image is reconstructed from each frame of list-mode data using known techniques. As shown in FIG. 5, image 510 is reconstructed from frame 505, image 520 is reconstructed from frame 515, and image 530 is reconstructed from frame 525. Since image 420 is a low-motion image, images 510-530 should be similar to one another.

A motion vector is determined which represents a natural movement which might occur during time period $t_0$-$t_1$, and the motion vector is applied to image 510. Next, a motion vector is determined which represents a natural movement which might occur during time period $t_1$-$t_2$ and is applied to image 520. The time-period specific motion vectors may be determined from a previously-determined function of motion over time which represents a natural patient motion.

Motion vectors are also determined and applied to all subsequent images. The resulting images are then summed to generate motion PET image 540.

In other embodiments, the period-specific motion vectors are applied directly to corresponding list-mode data frames 505, 515 and 525. The resulting frames are summed to create a single list-mode frame and a motion PET image is reconstructed from the list-mode data frame.

Figure 6:
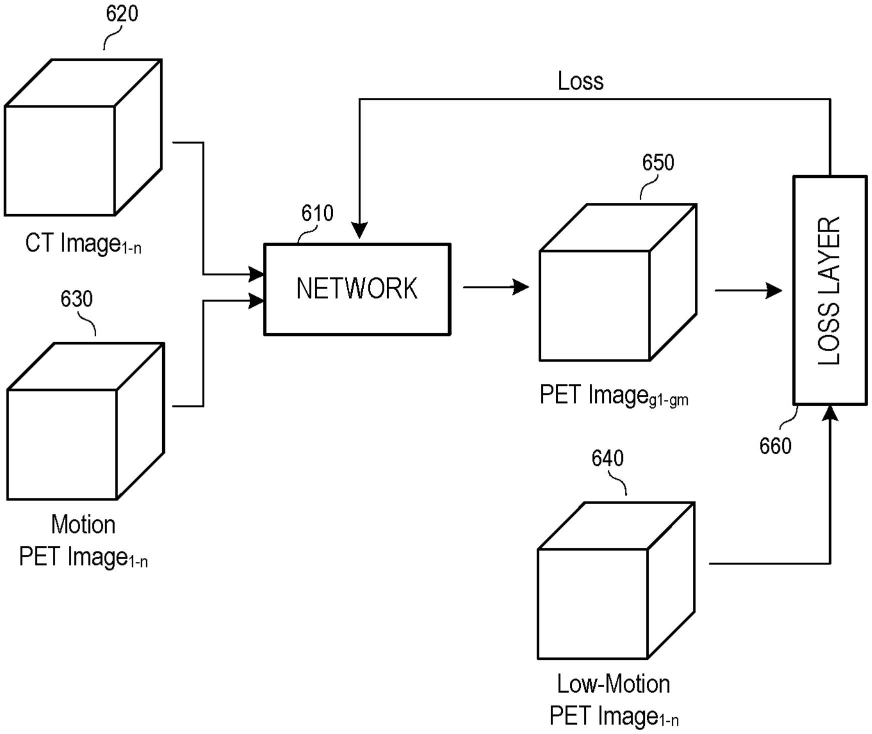
FIG. 6 illustrates training of a neural network to generate a motion-corrected MI image based on a Computed Tomography image and a Positron Emission Tomography image according to some embodiments.

Returning to process 200, a neural network is trained at S220 to generate a PET image from a CT image and a PET image based on the acquired training data. FIG. 6 illustrates training of neural network 610 according to some embodiments. Network 610 may comprise, for example, a generator of a Generative Adversarial Network (GAN) having trainable parameters as is known in the art. Network 610 may comprise any type of supervised or unsupervised learning-compatible network, algorithm, decision tree, etc. to receive image data and to output image data that is or becomes known, including but not limited to convolutional neural networks, cycle-GAN networks and U-Net networks.

Network 610 may comprise a plurality of layers of neurons which receive input, change internal state according to that input, and produce output depending on the input and internal state. The output of certain neurons is connected to the input of other neurons to form a directed and weighted graph. The weights as well as the functions that compute the internal states are iteratively modified during training s. Thusly-trained network 610 may be implemented by a set of linear equations, executable program code, a set of hyper-parameters defining a model structure and a set of corresponding weights, or any other representation of the mapping of input to output which was learned as a result of the training.

The training data of FIG. 6 consists of N CT images 620, N motion PET images 630 and N low-motion PET images 640. A plurality of sets of corresponding images 620, 630 and 640 may have been generated as described with respect to FIGS. 3 and 4. In the case of FIG. 3, the low-motion image 640 of a set is generated from the motion PET image 630 and, in the case of FIG. 4, the motion image 630 of the set is generated from the low-motion image 640.

During training, a batch of M CT images 620 and M corresponding motion PET images 630 is input to network 610, which generates a PET image 650 for each input image of the batch. Loss layer 660 calculates a loss based on differences between each of generated M PET images 650 and its corresponding ground truth low-motion PET image 640. The loss is back-propagated to network 610, which is modified with the aim of minimizing the loss as is known in the art. Training continues in this manner until satisfaction of a given performance target or a timeout situation.

Training may include any components suitable to train network 610 in view of the type of network 610. For example, if network 610 is a GAN, network 610 may comprise a generator trained using a discriminator, a random input generator, and a loss layer to determine generative loss and discrimination loss.

After training, network 610 may be deployed at S230 as shown in FIG. 1. The dashed arrow between S220 and S230 of process 200 indicates that S220 and S230 may occur at any temporal and/or geographical distance from one another. The trained network may be deployed in or in conjunction with many different scanners.

A CT image of an object is acquired at S240 using any suitable CT imaging protocol. For example, a CT imaging protocol is executed to acquire projection images of a patient and to reconstruct a CT image from the projection images.

Next, a PET image of the object is acquired at S250. The PET image may be acquired by a same scanner as used to acquire the CT image at S240 and may be acquired closely before or after in time.

The CT image and the PET image are input to trained neural network at S260. Per its training, the trained neural network generates a motion-corrected PET image based on the input images. The motion-corrected PET image preferably exhibits less motion artifacts than the input PET image.

Figure 7:
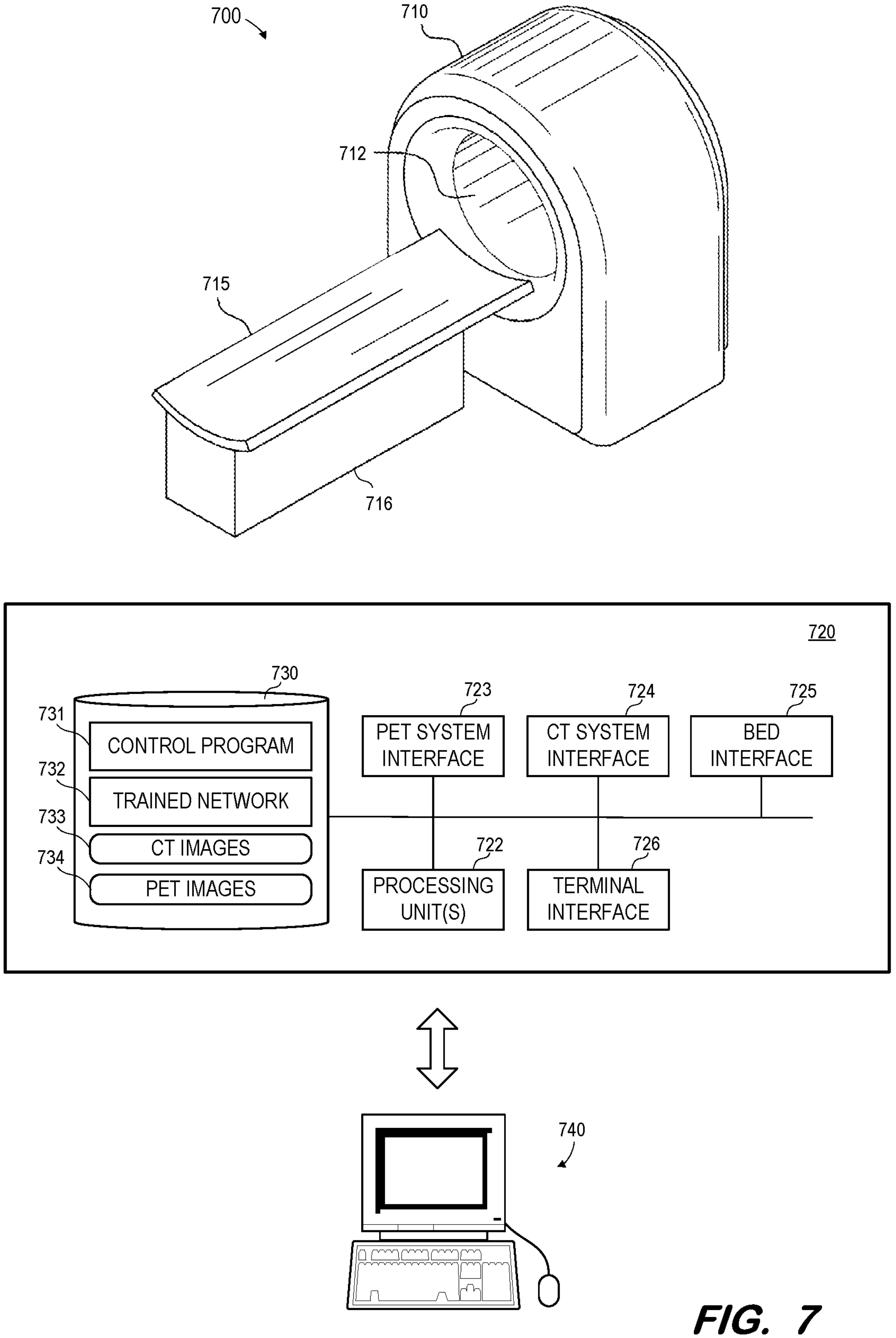
FIG. 7 is a block diagram of an imaging system according to some embodiments.

FIG. 7 illustrates PET/CT scanner 700 to execute one or more of the processes described herein. Embodiments are not limited to scanner 700 or to a multi-modality imaging system.

Scanner 700 includes gantry 710 defining bore 712. As is known in the art, gantry 710 houses PET imaging components for acquiring PET image data and CT imaging components for acquiring CT image data. The CT imaging components may include one or more x-ray tubes and one or more corresponding x-ray detectors as is known in the art. The PET imaging components may include any number or type of detectors including background radiation-emitting crystals and disposed in any configuration as is known in the art.

Bed 715 and base 716 are operable to move a patient lying on bed 715 into and out of bore 712 before, during and after imaging. In some embodiments, bed 715 is configured to translate over base 716 and, in other embodiments, base 716 is movable along with or alternatively from bed 715.

Movement of a patient into and out of bore 712 may allow scanning of the patient using the CT imaging elements and the PET imaging elements of gantry 710. Bed 715 and base 716 may provide continuous bed motion and/or step-and-shoot motion during such scanning according to some embodiments.

Control system 720 may comprise any general-purpose or dedicated computing system. Accordingly, control system 720 includes one or more processing units 722 configured to execute executable program code to cause system 720 to acquire image data and generate images therefrom, and storage device 730 for storing the program code. Storage device 730 may comprise one or more fixed disks, solid-state random-access memory, and/or removable media (e.g., a thumb drive) mounted in a corresponding interface (e.g., a Universal Serial Bus port).

Storage device 730 stores program code of control program 731. One or more processing units 722 may execute control program 731 to control CT imaging elements of scanner 700 using CT system interface 724 and bed interface 725 to acquire CT data and to reconstruct CT images 733 therefrom. One or more processing units 722 may execute control program 731 to, in conjunction with PET system interface 723 and bed interface 725, detect photons emitted from the patient based on pulses generated by the PET detectors. The detected photons may be recorded in storage 730 as PET data, which may comprise raw (i.e., list-mode) data and/or sinograms. Control program 731 may also be executed to reconstruct PET images 734 based on PET data using any suitable reconstruction algorithm that is or becomes known. According to some embodiments, PET images 734 may be reconstructed based at least in part on CT images 733 (e.g., using a linear attenuation coefficient map determined from a CT image 733).

Trained network 732 may comprise code executable to perform an input data-to-output data mapping specified by trained network parameters. A CT image 733 and a PET image 734 may be input to trained network 732 to generate a motion-corrected PET image as described above. Such a motion-corrected PET image may also be stored in PET images 734.

PET images 734 and CT images 733 may be transmitted to terminal 740 via terminal interface 726. Terminal 740 may comprise a display device and an input device coupled to system 720. Terminal 740 may display the received PET images 734 and CT images 733. Terminal 740 may receive user input for controlling display of the data, operation of scanner 700, and/or the processing described herein. In some embodiments, terminal 740 is a separate computing device such as, but not limited to, a desktop computer, a laptop computer, a tablet computer, and a smartphone.

Each component of scanner 700 may include other elements which are necessary for the operation thereof, as well as additional elements for providing functions other than those described herein. Each functional component described herein may be implemented in computer hardware, in program code and/or in one or more computing systems executing such program code as is known in the art. Such a computing system may include one or more processing units which execute processor-executable program code stored in a memory system.

Those in the art will appreciate that various adaptations and modifications of the above-described embodiments can be configured without departing from the claims. Therefore, it is to be understood that the claims may be practiced other than as specifically described herein.

What is claimed is:

1. A molecular imaging scanner comprising:

a plurality of photon detectors; and a processing unit to:

determine an anatomical image of an object;

acquire molecular imaging data of the object at the plurality of photon detectors;

reconstruct a functional image based on the molecular imaging data; and input the anatomical image and the functional image to a trained neural network to generate a second functional image; and a display to present the second functional image, wherein the neural network is trained based on a plurality of sets of training data, each of the plurality of sets of training data comprising:

a training anatomical image;

a training functional image exhibiting motion artifacts; and a ground truth functional image exhibiting less motion artifacts than the training functional image, and wherein each of the plurality of sets of training data is generated by:

acquiring a first ground truth functional image;

determining a plurality of data frames from which the first ground truth functional image was generated and a respective time period associated with each of the plurality of data frames;

determining a motion vector associated with each of the respective time periods;

for each of the respective time periods, applying the motion vector associated with the time period to the data frame associated with the time period to generate a modified data frame; and generating a first training functional image based on the modified data frames.

2. A scanner according to claim 1, the processing unit to:

determine a linear attenuation correction map based on the anatomical image, wherein reconstruction of the functional image is based on the linear attenuation correction map and the molecular imaging data.

3. A scanner according to claim 1, wherein the motion vector associated with each of the respective time periods is determined based on a function of motion over time which represents a natural patient motion.

4. A method comprising:

acquiring a computed tomography image of an object;

acquiring positron emission tomography data of the object;

reconstructing a positron emission tomography image based on the positron emission tomography data;

inputting the computed tomography image and the positron emission tomography image to a trained neural network to generate a second positron emission tomography image; and presenting the second positron emission tomography image, wherein the neural network is trained based on a plurality of sets of training data, each of the plurality of sets of training data comprising:

a training computed tomography image;

a training positron emission tomography image exhibiting motion artifacts; and a ground truth positron emission tomography image exhibiting less motion artifacts than the training positron emission tomography image, and wherein each of the plurality of sets of training data is generated by:

acquiring a first ground truth positron emission tomography image;

determining a plurality of data frames from which the first ground truth positron emission tomography image was generated and a respective time period associated with each of the plurality of data frames;

determining a motion vector associated with each of the respective time periods;

for each of the respective time periods, applying the motion vector associated with the time period to the data frame associated with the time period to generate a modified data frame; and generating a first training positron emission tomography image based on the modified data frames.

5. A method according to claim 4, further comprising:

determining a linear attenuation correction map based on the computed tomography image, wherein reconstructing the positron emission tomography image is based on the linear attenuation correction map and the positron emission tomography data.

6. A method according to claim 4, wherein the motion vector associated with each of the respective time periods is determined based on a function of motion over time which represents a natural patient motion.

7. A non-transitory medium storing program code, the program code executable by at least one processing unit to cause a computing system to:

acquire an anatomical image of an object;

acquire molecular imaging data of the object at the plurality of photon detectors;

reconstruct a functional image based on the molecular imaging data;

input the anatomical image and the functional image to a trained neural network to generate a second functional image; and present the second functional image, wherein the neural network is trained based on a plurality of sets of training data, each of the plurality of sets of training data comprising:

a training anatomical image;

a training functional image exhibiting motion artifacts; and a ground truth functional image exhibiting less motion artifacts than the training functional image, and wherein each of the plurality of sets of training data is generated by:

acquiring a first ground truth functional image;

determining a plurality of data frames from which the first ground truth functional image was generated and a respective time period associated with each of the plurality of data frames;

determining a motion vector associated with each of the respective time periods;

for each of the respective time periods, applying the motion vector associated with the time period to the data frame associated with the time period to generate a modified data frame; and generating the first training functional image based on the modified data frames.

8. A medium according to claim 7, the program code executable by at least one processing unit to cause a computing system to:

determine a linear attenuation correction map based on the anatomical image, wherein reconstruction of the functional image is based on the linear attenuation correction map and the molecular imaging data.

9. A medium according to claim 7, wherein the motion vector associated with each of the respective time periods is determined based on a function of motion over time which represents a natural patient motion.

* * * * *